United States Patent [19]
Ozaki et al.

[11] Patent Number: 5,895,113
[45] Date of Patent: Apr. 20, 1999

[54] VEHICLE HEADLAMP HAVING A CONDUCTIVE ELECTROMAGNETIC WAVE SHIELDING MEMBER

[75] Inventors: Akiyosi Ozaki; Takashi Hori, both of Shizuoka, Japan

[73] Assignee: Koito Manufacturing Co., Ltd., Tokyo, Japan

[21] Appl. No.: 08/766,462

[22] Filed: Dec. 12, 1996

[30] Foreign Application Priority Data

Dec. 28, 1995 [JP] Japan ................... 7-342537

[51] Int. Cl.[6] ........................... B60Q 1/04
[52] U.S. Cl. ........................ 362/546; 362/265
[58] Field of Search ............... 362/61, 263, 265, 362/293, 546

[56] References Cited

U.S. PATENT DOCUMENTS

| | | | |
|---|---|---|---|
| 5,107,405 | 4/1992 | Makita | 362/61 |
| 5,113,330 | 5/1992 | Makita | 362/265 |
| 5,118,990 | 6/1992 | Makita | 315/77 |
| 5,124,895 | 6/1992 | Segoshi et al. | 362/265 |
| 5,130,904 | 7/1992 | Ohshio et al. | 362/61 |
| 5,132,881 | 7/1992 | Wakimizu et al. | 362/61 |
| 5,140,504 | 8/1992 | Sato | 362/61 |
| 5,169,224 | 12/1992 | Segoshi et al. | 362/263 |
| 5,180,218 | 1/1993 | Ohshio | 362/61 |
| 5,188,444 | 2/1993 | Makita et al. | 362/80 |
| 5,220,235 | 6/1993 | Wakimizu et al. | 362/293 |
| 5,228,766 | 7/1993 | Makita | 362/61 |
| 5,243,501 | 9/1993 | Makita et al. | 362/293 |
| 5,251,110 | 10/1993 | Leleve | 362/61 |
| 5,258,686 | 11/1993 | Segoshi et al. | 362/293 |
| 5,343,370 | 8/1994 | Ohashi et al. | 362/61 |
| 5,382,876 | 1/1995 | Sugasawa et al. | 315/82 |
| 5,448,453 | 9/1995 | Oshio | 362/61 |
| 5,448,461 | 9/1995 | Fast et al. | 362/293 |
| 5,465,195 | 11/1995 | Jenner et al. | 362/61 |
| 5,497,298 | 3/1996 | Luallin et al. | 362/61 |

*Primary Examiner*—Laura Tso
*Attorney, Agent, or Firm*—Sughrue, Mion, Zinn Macpeak & Seas, PLLC

[57] ABSTRACT

A vehicle headlamp in which a front lens is put in the front opening of a capsule-like lamp body, to thereby form a lamp chamber in the lamp body, and a reflector unit containing a discharge bulb as a light source is provided in the lamp chamber, the vehicle headlamp being characterized in that an opening for bulb exchanging is formed in the rear wall of the lamp body, a cover is removably attached to the opening, and a conductive, electromagnetic wave shielding member, which surrounds at least the rear part of the discharge bulb is provided in the opening.

23 Claims, 13 Drawing Sheets

VEHICLE HEADLAMP HAVING A CONDUCTIVE ELECTROMAGNETIC WAVE SHIELDING MEMBER

BACKGROUND OF THE INVENTION

1. Field of the Invention

The present invention relates to a vehicle headlamp of the type in which a discharging bulb is used for its light source.

2. Related Art

There is a recent demand of discharge bulbs because the bulbs are good in luminance efficiency and color rendering property, and long in lifetime. The study has actively been made on the application of the discharge bulb as a light source of the headlamp for motor vehicles.

In order to activate the discharging operation of the discharge bulb, a starter circuit must be used which applies a high tension between the opposed electrodes of the discharge bulb. When a switching element for generating high tension pulses is driven and the discharge bulb discharges, electromagnetic waves are generated, and cause noise harmful to other electrical parts assembled into the automobile.

A measure for addressing the electromagnetic waves emitted from the discharge bulb is to form a conductive layer on the lamp body to prevent the electromagnetic waves from leaking out of the lamp. A measure for addressing the electromagnetic waves emitting from the starter circuit is to put the starter circuit in a conductive metal case to confine the electromagnetic waves within the metal case.

The above-noted measures can effectively interrupt the electromagnetic waves emitted from the discharge bulb and the starter circuit, but cannot interrupt the electromagnetic waves emitted from a power cable connecting the starter circuit to the discharge bulb and a connection part between the power cable and the discharge bulb.

SUMMARY OF THE INVENTION

The present invention has been made in view of the above circumstances. Accordingly, it is an object of the invention to provide a vehicle headlamp with a discharging bulb as its light source, which can effectively interrupt the electromagnetic waves emitted from the power cable connecting the starter circuit to the discharge bulb and a rear part of the discharge bulb.

The above and other objects can be achieved by a provision of a vehicle headlamp which, according to the present invention, includes a front lens placed in the front opening of a capsule-like lamp body, to thereby form a lamp chamber in the lamp body, and a reflector unit containing a discharge bulb as a light source is provided in the lamp chamber, the vehicle headlamp being improved in that an opening for bulb exchanging is formed in the rear wall of the lamp body, a cover is removably attached to the opening, and a conductive, electromagnetic wave shielding member, which surrounds at least the rear part of the discharge bulb is provided in the opening.

The electromagnetic wave shielding member is made of conductive material, and electrically connected to the cover which is made of conductive material and has an electromagnetic wave shielding function.

Further, the electromagnetic wave shielding member is a cylindrical member constructed such that the cylindrical member surrounds the rear part of the discharge bulb, and the fore end thereof is extended forward to come in contact with or in proximity to the reflector.

Additionally, the electromagnetic wave shielding member is formed with a ring-like member fixed to the cover or the lamp body and elastic pieces extended from the ring-like member toward the reflector.

Moreover, the electromagnetic wave shielding member is a metal plate or a metal conductive film provided on the inner surface of the lamp body.

Further, a starter circuit unit containing a starter circuit for applying a high tension to the discharge bulb is fixed to the lamp body, and a power cord for connecting the starter circuit to the discharge bulb is disposed in a space defined by the electromagnetic wave shielding member and the cover.

Furthermore, the electromagnetic wave shielding member and the cover are earthed through a metal layer formed on the power cord.

In addition, the electromagnetic wave shielding member and the cover are earthed through a conductive unit case of the starter circuit unit.

The operation of the present invention will be described hereunder.

In the vehicle headlamp of a first aspect of the invention, an electromagnetic wave, which is generated from the rear end of the discharge bulb when the discharge bulb is turned on, is interrupted by the electromagnetic wave shielding member that surrounds the rear end of the discharge bulb.

In the vehicle headlamp of a second aspect of the inventions, an electromagnetic wave, which is generated from the rear end of the discharge bulb when the discharge bulb is turned on, is interrupted by the cover having an electromagnetic wave shielding function and the electromagnetic wave shielding members, both being disposed so as to cover the rear end of the discharge bulb.

In the vehicle headlamp of a third aspect of the inventions, the fore end of the cylindrical electromagnetic wave shielding member is extended forward to come in contact with or in proximity to the reflector to surround the arc tube of the discharge bulb. With this structure, an electromagnetic wave generated from the arc tube is also interrupted by the electromagnetic wave shielding member.

In the vehicle headlamp of a fourth aspect of the invention, when the reflector is tilted by an aiming mechanism, the elastic pieces of the electromagnetic wave shielding member are pushed with the reflector to be elastically deformed. Accordingly, the reflector can be smoothly tilted.

In the vehicle headlamp of a fifth aspect of the invention, an electromagnetic wave generated from the arc tube is interrupted by a metal plate or a metal conductive film provided on the inner surface of the lamp body.

In the vehicle headlamp of a sixth aspect of the invention, an electromagnetic wave generated from a power cord connecting the discharge bulb and the starter circuit is interrupted by an electromagnetic wave shielding member surrounding the power cord and the cover having an electromagnetic wave shielding function.

In the vehicle headlamp of a seventh aspect of the invention, a power cord (of which the metal layer) connecting the discharge bulb and the starter circuit serves as a conductive path for earthing the electromagnetic wave shielding member and the cover.

In the vehicle headlamp of an eighth aspect of the invention, a conductive unit case of a starter circuit unit containing a starter circuit serves as a conductive path for earthing the electromagnetic wave shielding member and the cover.

DESCRIPTION OF THE PREFERRED EMBODIMENTS

The preferred embodiments of the present invention will be described with reference to accompanying drawings.

Figure 1:
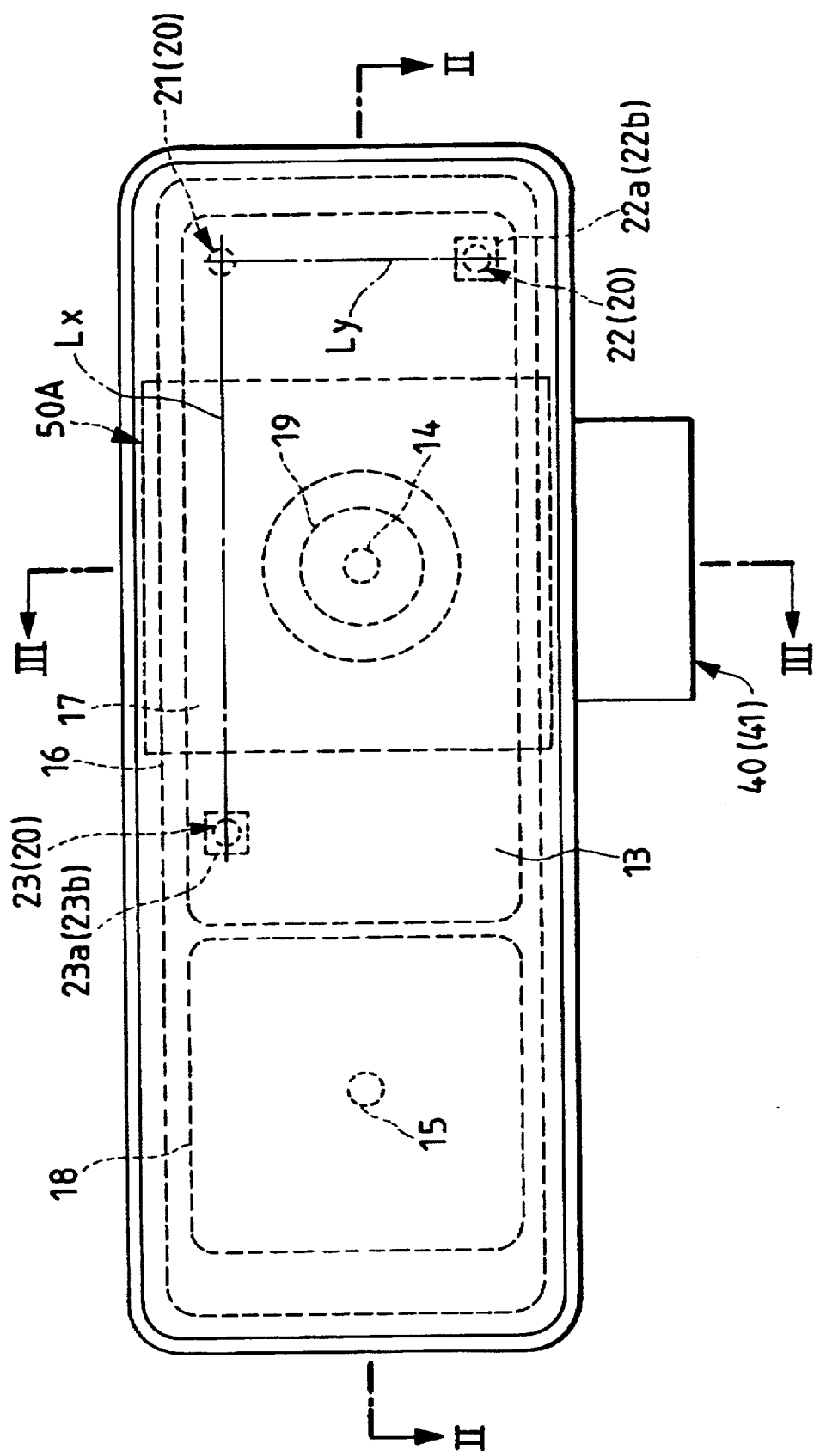
FIG. 1 is a front view showing a headlamp for motor vehicles according to a first embodiment of the present invention.
Figure 2:
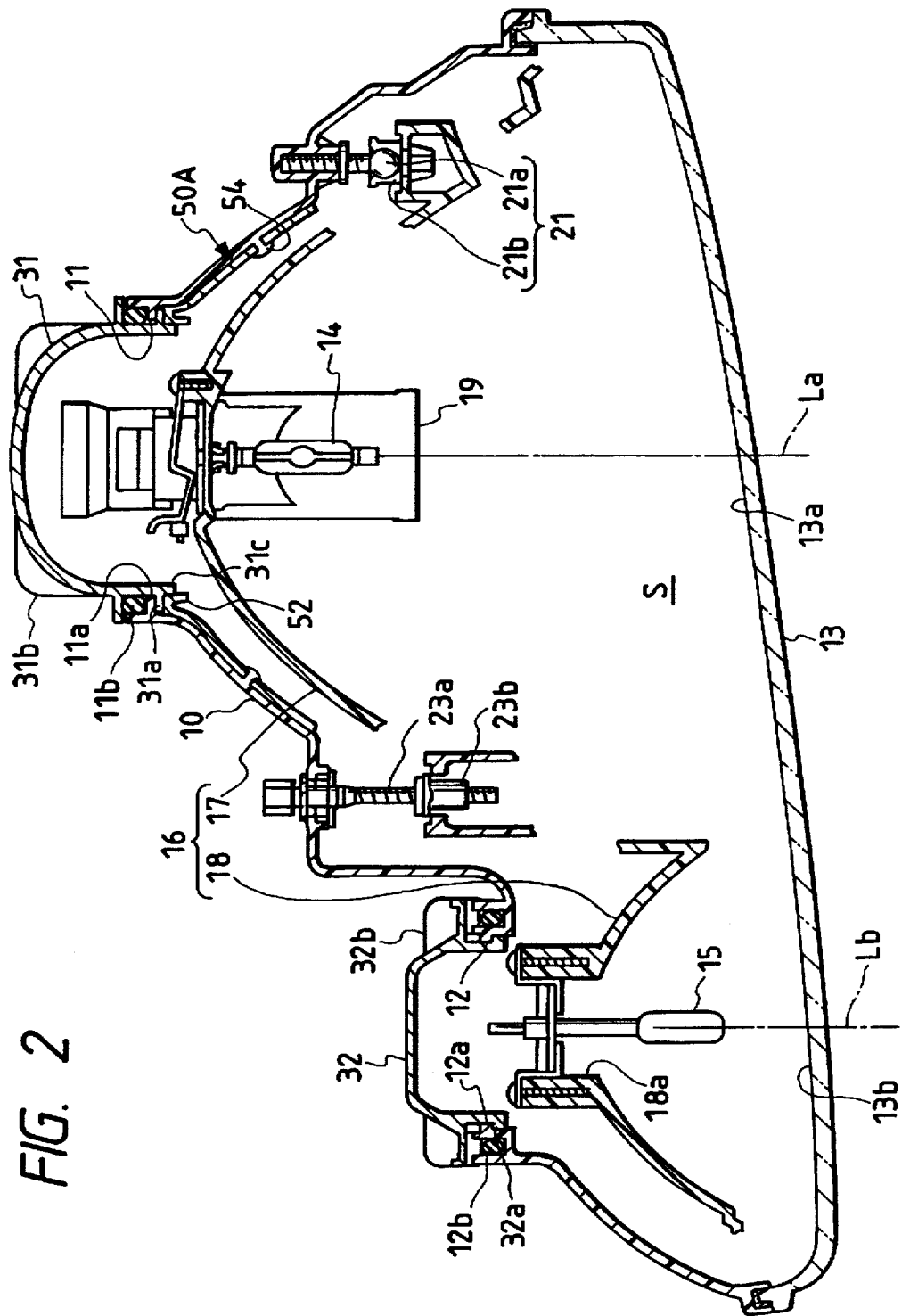
FIG. 2 is a horizontal sectional view showing of the headlamp (sectional view taken on line II—II in FIG. 1)
Figure 3:
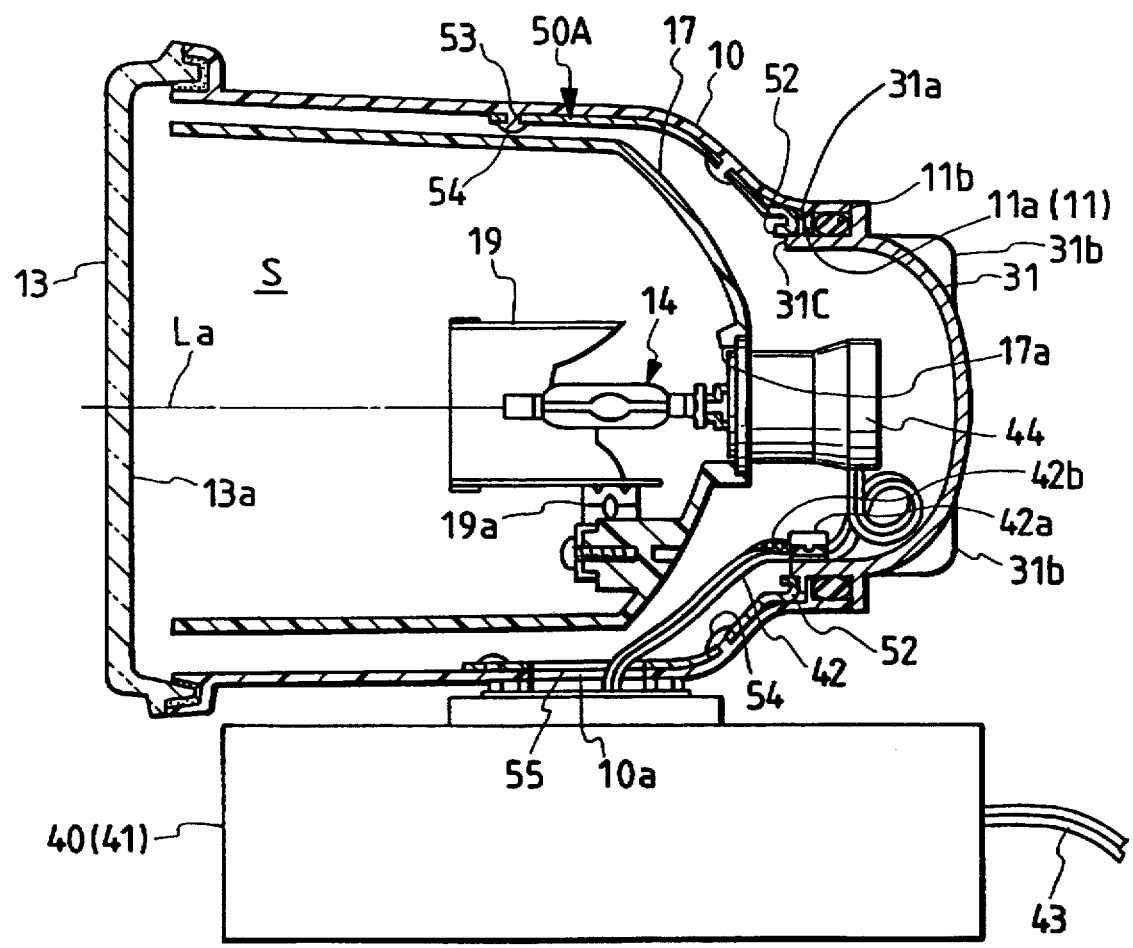
FIG. 3 is a longitudinal sectional view of the lamp (sectional view taken on line III—III in FIG. 1)
Figure 4:
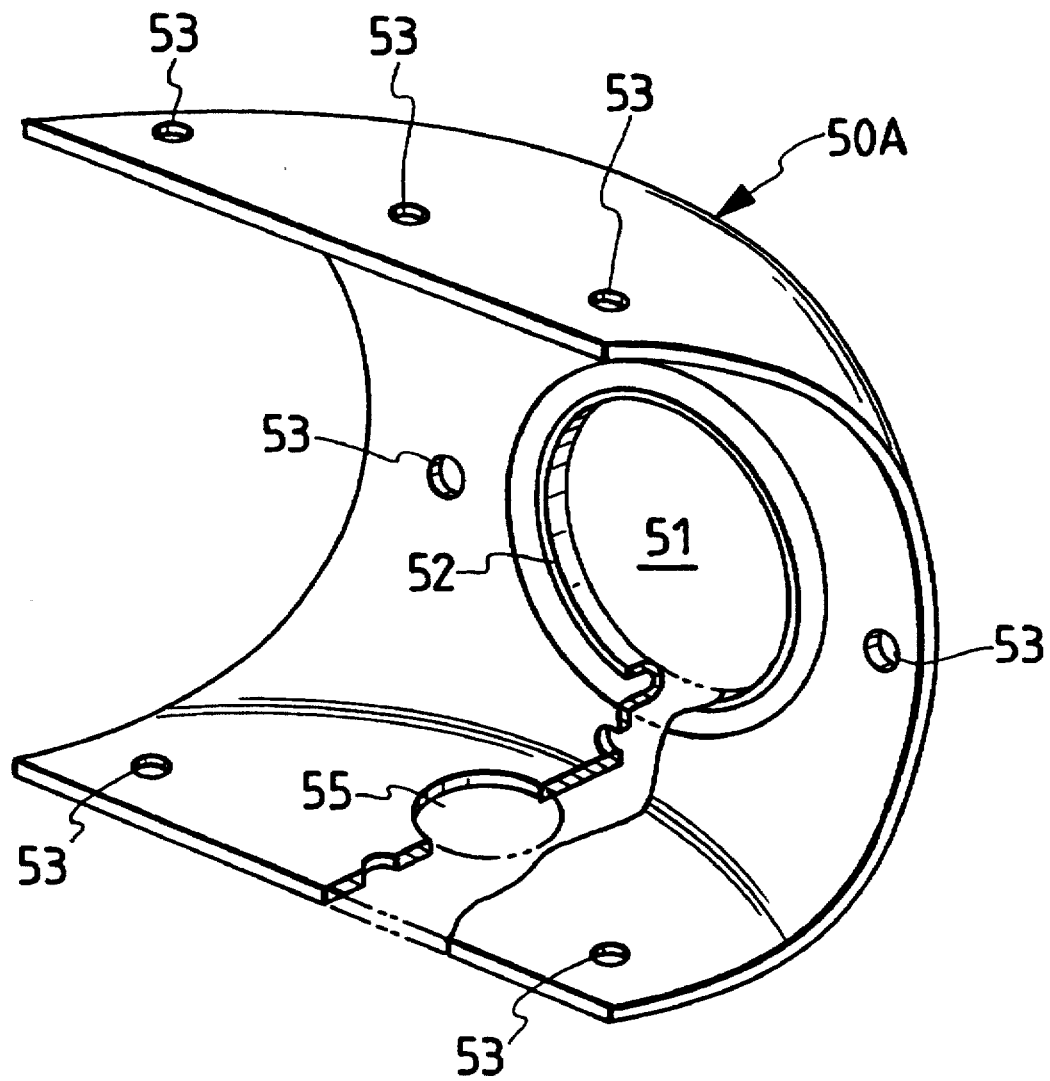
FIG. 4 is a perspective view, partly broken, showing a metal plate as a conductive electromagnetic shielding member used in the first embodiment.

FIGS. 1 through 4 show a first embodiment of the present invention. Specifically, FIG. 1 is a front view showing a headlamp for motor vehicles according to a first embodiment of the present invention. FIG. 2 is a horizontal sectional view showing of the headlamp (sectional view taken on line II—II in FIG. 1). FIG. 3 is a longitudinal sectional view of the lamp (sectional view taken on line II—II in FIG. 1). FIG. 4 is a perspective view, partly broken, showing a metal plate as a conductive electromagnetic shielding member, which is provided on the inner surface of the lamp body.

In those figures, reference numeral 10 designates a capsule like lamp body made of synthetic resin. A front lens 13 is put in the front opening of the lamp body 10, to thereby form a lamp chamber S in the lamp body. A reflector unit 16 made of synthetic resin or metal are provided in the lamp chamber S. A discharge bulb 14 and an incandescent bulb 15, which are light sources, are inserted into the reflector unit 16.

Parabolic reflectors 17 and 18, located side by side, are assembled into the reflector unit 16. Bulb insertion holes 17a and 18a are formed in the rear portions of the parabolic reflectors 17 and 18, respectively. A shade 19 is disposed in front of the discharge bulb 14. The shade 19 functions to prevent generation of glare and to form a clear cut line for the low beams. In FIG. 3, reference numeral 19a designates a leg of the shade 19 that is fixed to the reflector 17 by means of screw means. Light beams emitted from the discharge bulb 14 are reflected by the reflector 17 and distributed forward in a predetermined direction by distribution control steps 13a formed on the rear side of the front lens 13, to thereby form a distribution pattern of low beams. Light beams emitted from the bulb 15 are reflected by a reflector 18, distributed forward in a predetermined direction by distribution control steps 13b formed on the rear side of the front lens 13, to thereby form a distribution pattern of main beams. When the discharge bulb 14 alone is turned on, the low beams are produced. When the bulbs 14 and 15 are simultaneously turned on, the high beams are produced.

The reflector unit 16 with the bulbs 14 and 15 inserted thereinto is tiltable with respect to a horizontal axis Lx and a vertical axis Ly by means of an aiming mechanism 20. The aiming mechanism 20 includes a fixed supporting point 21 having a ball and socket joint structure, and a pair of movable supports 22 and 23.

The fixed support 21 is formed with a ball 21a fixed to the lamp body 10 and a socket 21b for supporting the ball 21a, fixed to the rear side of the reflector unit 16 (reflector 17). The reflector unit 16 (reflector 17) is tiltable about the fixed supporting point 21. The movable support 22 is mounted on the lamp body 10 in a state that it longitudinally passes through the lamp body. The movable support 22 includes an aiming screw 22a and a nut 22b. The aiming screw 22a is rotatably supported by the lamp body 10 at the portion of the lamp body where the movable support 22 passes therethrough. The nut 22b is fixed to the rear side of the reflector unit 16 (reflector 17). The aiming screw 22a is screwed into the nut 22b. The nut 22b moves forward and backward when the aiming screw 22a is turned. Similarly, another support 23 is mounted on the lamp body 10 and includes an aiming screw 23a and a nut 23b. The screw-nut structure is substantially the same as that of the movable support 22, and operates in a similar manner. When the rear parts of the aiming screws 22a and 23a, which are protruded rearwardly from the rear surface of the lamp body 10, are properly turned, the reflector unit 16 is tilted about the horizontal axis Lx and the vertical axis Ly, whereby the aiming directions La and Lb of the light beams are tilted back and forth as well as to the right and left.

Openings 11 and 12, used for bulb exchanging, are formed at the locations of the rear wall of the lamp body 10, which correspond to the bulb insertion holes 17a and 18a of the reflectors 17 and 18. Covers 31 and 32 are attached to the openings 11 and 12, respectively. In this case, a bayonet socket structure is used for coupling the covers with the openings. Accordingly, the covers 31 and 32 can easily be attached to and detached from the openings Numeral 31a and 32a designate pawls of the cover; 11a and 12a, flange-like protrusions extended from the inner peripheral surface of the openings 11 and 12; and 11b and 12b, O rings to tightly close the gaps between the openings and the cover. 31b and 32b designates ribs radially provided on the rear surfaces of the covers 31 and 32. These ribs make it easy to grip the covers 31 and 32 and to turn the covers 31 and 32.

A heavy starter/ballast circuit unit 40 contains a starter circuit for starting a discharging operation between the electrodes of the discharge bulb (arc tube) 14 by applying a high tension to the arc tube, and a ballast circuit for maintaining a stable discharging between the electrodes of the arc tube. The starter/ballast circuit unit 40 is fixed to the outer side of the bottom wall of the lamp body 10 by suitable fixing means (not shown), for example, screws or male-female rance engagement or the like.

Therefore, the center of gravity of the headlamp is set at a lower position, so that the headlamp is mechanically stable. Further, the transmission of heat that is generated in the lamp chamber S when the discharge bulb 14 is lit on to the starter circuit and the ballast circuit is considerably impeded. Accordingly, the problem on the heat of those circuits is lessened.

A cord insertion hole 10a is formed in the location of the bottom wall of the lamp body 10 where the starter/ballast circuit unit 40 is mounted thereon. A power cord 42 extended from the starter circuit of the starter/ballast circuit unit 40 is connected to the discharge bulb 14 in the lamp chamber S by way of the cord insertion hole 10a and a connector 44.

The cover 31 that is attached to the opening 11 is made of aluminum of good conductivity. It is connected to the minus terminal of a battery, through a conductive housing 41 for the power cord 42 and the starter/ballast circuit unit 40. With this connection, its earthing is secured. An electromagnetic wave that is generated at the connector 44 connected to the discharge bulb 14 is confined within the cover 31. The cover 31 is electrically connected to the conductive housing 41 through a metal mesh layer of the power cord 42, which is layered between an inner insulating layer covering a cable core (signal line) and an outer insulating layer. The conductive housing 41 is electrically connected to the negative terminal of a power cord 43 connected from the battery to the starter/ballast circuit unit 40. A metal bracket 42a is used for fastening the power cord 42 to the inner side of the cover by screw means. An exposed mesh layer 42b of the power cord 42 is electrically connected to the conductive cover 31 by way of the metal bracket 42a.

An electromagnetic wave shielding member 50A is provided in the opening 11 for bulb exchanging such that it is in contact with the cover 31, extended along the inner surface of the lamp body 10, and surrounds the discharge bulb 14. Electromagnetic waves generated by the discharge bulb 14 and the power cord 42 are prevented from emitting outside by the electromagnetic wave shielding member 50A.

The electromagnetic wave shielding member 50A is laminated on the inner surface of the lamp body 10. More specifically, a thin plate is prepared which is made of material of good conductivity, for example, copper or iron, and shaped in conformity with the inner surface of the lamp body 10. Protrusions 54 are formed on the inner surface of the lamp body 10. The thin plate is put on the inner surface of the lamp body having the protrusions 54, and pressed against the inner surface thereof. At this time, the protrusions 54 are crushed and flattened by heat. An opening 51, which is to be coupled with the opening 11, is formed in the electromagnetic wave shielding member 50A. The peripheral edge of the opening 51 is turned inward to form a peripheral edge part 52. In coupling the opening 51 with the opening 11, the peripheral edge 52 elastically comes in contact with the front end 31c of the opening of the cover 31, to thereby electrically connect the electromagnetic wave shielding member 50A to the cover 31.

Reference numeral 53 designates a hole 53 for receiving the protrusion 54 formed in the electromagnetic wave shielding member 50A. Numeral 55 indicates a cord insertion hole 55 formed in the lower side of the electromagnetic wave shielding member 50A. The cord insertion hole 55 corresponds in position to the cord insertion hole 10a.

Thus, in the present embodiment, when the discharge bulb 14 is turned on, the electromagnetic waves generated by the discharge bulb 14, the connector 44 and the power cord 42 are completely interrupted by the electromagnetic wave shielding member 50A and the cover 31, whereby the electromagnetic waves generated upon the turning-on of the discharge bulb are perfectly prevented from leaking to the outside of the lamp body 10.

In the embodiment, the electromagnetic wave shielding member 50A and the cover 31 are earthed by the power cords 42 and 43. In other words, there is no need of using additional cords for earthing the electromagnetic wave shielding member 50A and the cover 31. This leads to easy assembling of the headlamp and the saving of the space used.

Figure 5:
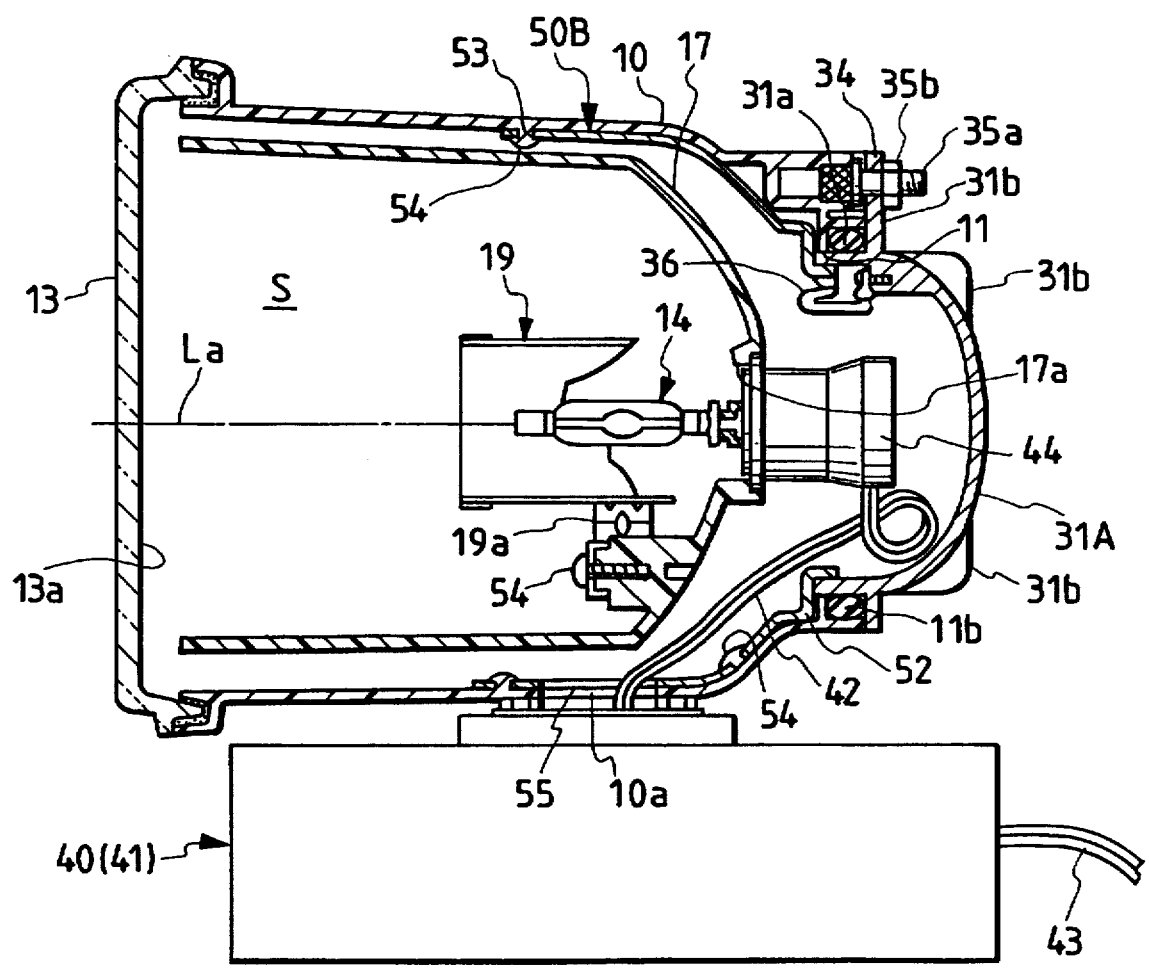
FIG. 5 is a longitudinal sectional view showing a vehicle headlamp according to a second embodiment of the present invention.
Figure 6:
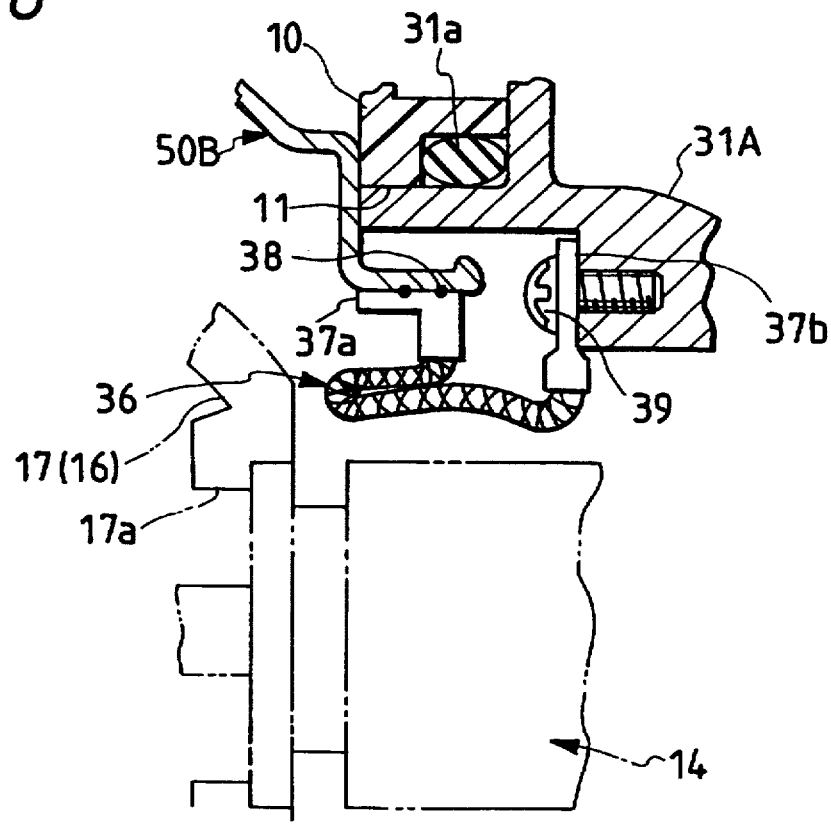
FIG. 6 is an enlarged view showing an electrical connection structure including a cover mounted on an opening for bulb exchange and an electromagnetic wave shielding member.

FIGS. 5 and 6 cooperate to show a second embodiment of the present invention. Of these figures, FIG. 5 is a longitudinal sectional view showing a vehicle headlamp according to the second embodiment. FIG. 6 is an enlarged view showing an electrical connection structure including a cover mounted on an opening for bulb exchange and an electromagnetic wave shielding member.

In the first embodiment described above, the peripheral edge part 52 of the rear part of the electromagnetic wave shielding member 50A directly contacts with the cover 31, to thereby secure an electrical contact of the shielding member 50A and the cover 31. Also in the second embodiment, an electromagnetic wave shielding member 50B, like the electromagnetic wave shielding member 50A of the first embodiment, is provided which is layered on the inner surface of the lamp body. The peripheral edge of the rear part of the electromagnetic wave shielding member 50B is electrically connected to the front part of the opening of a cover 31A by means of a wire 36 of a soft copper mesh plated with tin. Reference numeral 38 is indicative of a spot welding part located between the electromagnetic wave shielding member 50B and a pressure-attaching terminal 37a of the wire 36. Numeral 39 indicates a screw for fixing a pressure-attaching terminal 37b of the wire 36 to the front part of the cover 31A.

In the first embodiment, the bayonet socket structure is used for fixing the cover 31 to the opening 11. In the second embodiment, a bolt-nut structure is used for fixing the cover 31A to the opening 11. The cover 31A is provided with horizontally extended parts 34. The horizontally extended parts 34 are equidistantly arranged in the circumferential direction, and have bolt insertion holes. The horizontally extended parts 34 are fixed by bolts 35a and nuts 35b engaging the bolts 35a. The bolts 35a are buried into the periphery of the opening 11 of the lamp body 10.

The remaining construction of the second embodiment is substantially the same as of the first embodiment. Hence, no further description of it will be given.

Figure 7:
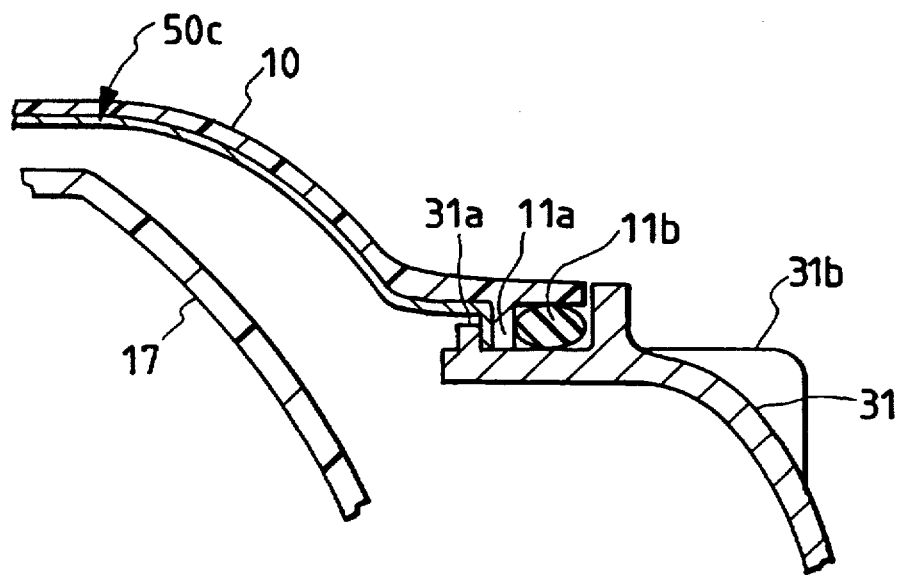
FIG. 7 is an enlarged, longitudinal sectional view showing a key portion of a vehicle headlamp according to a third embodiment of the present invention.

FIG. 7 is an enlarged, longitudinal sectional view showing a key portion of a vehicle headlamp according to a third embodiment of the present invention.

In the first and second embodiments, the electromagnetic wave shielding members 50A and 50B are each the metal plate layered on the inner surface of the lamp body. In the third embodiment, an electromagnetic wave shielding member 50C made of conductive material is used which is a conductive film formed over the inner surface of the lamp body 10.

The conductive coating film (electromagnetic wave shielding member 50C), which surrounds the discharge bulb 14 extends to reach the inner side of a flange-like protrusion 11a protruded from the inner surface of the opening 11. When the protrusion 11a and a pawl 31a of the cover 31 forming in part the bayonet socket structure are brought into contact with the conductive coating film (electromagnetic wave shielding member 50C), an electrical connection of the conductive coating film (electromagnetic wave shielding member 50C) and the cover 31 is secured.

The remaining construction of the third embodiment is substantially the same as of the first embodiment. Hence, no further description of it will be given.

Figure 8:
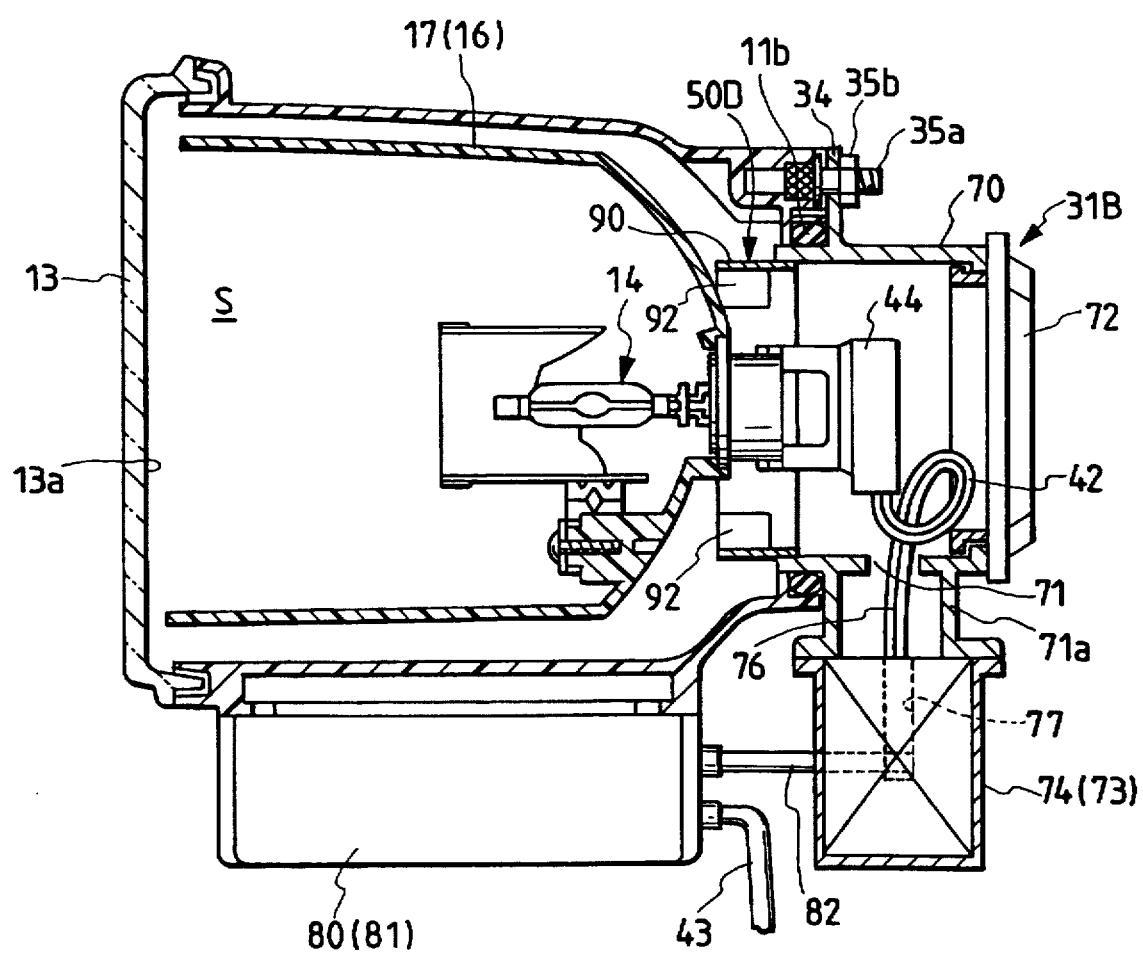
FIG. 8 is a longitudinal sectional view showing a vehicle headlamp according to a fourth embodiment of the present invention.
Figure 9:
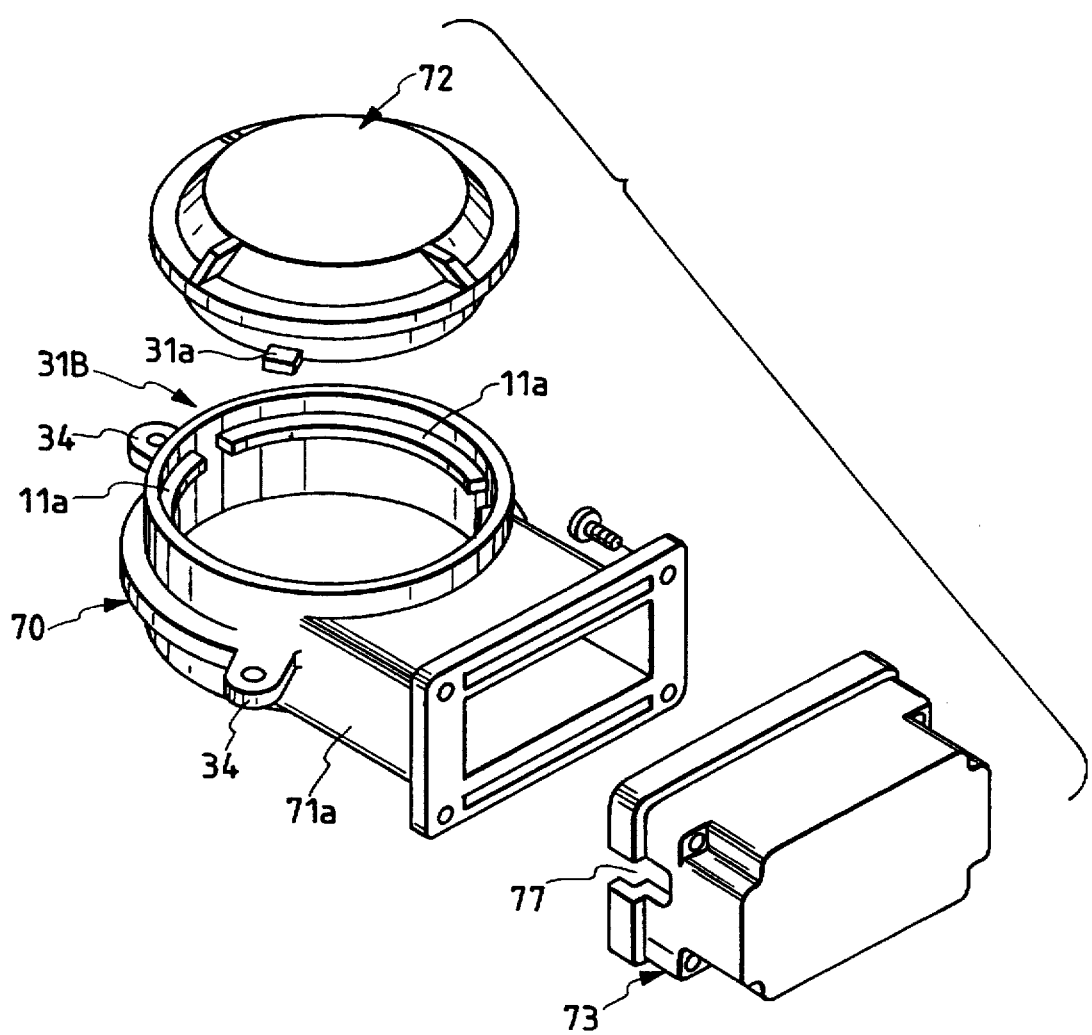
FIG. 9 is an exploded, perspective view showing a cover mounted on a bulb exchange opening in a lamp body of the headlamp.
Figure 10:
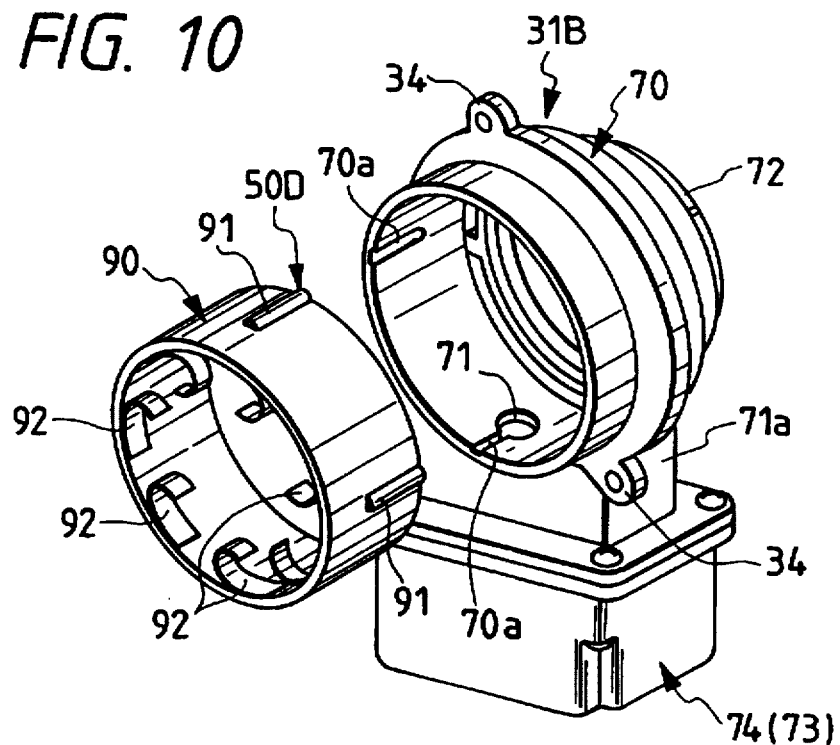
FIG. 10 is a perspective view showing a structure including a conductive cover provided at the bulb exchange opening of the lamp body and an electromagnetic wave shielding member.

FIGS. 8 through 10 show a fourth embodiment of the present invention. Of these figures, FIG. 8 is a longitudinal sectional view showing a vehicle headlamp according to a fourth embodiment of the present invention. FIG. 9 is an exploded, perspective view showing a cover mounted on a bulb exchange opening in a lamp body of the headlamp. FIG. 10 is a perspective view showing a structure including a conductive cover provided at the bulb exchange opening of the lamp body and an electromagnetic wave shielding member.

In the first and second embodiments of the invention, the starter circuit and the ballast circuit are assembled into a unit, and the unit is fixed on the outer surface of the lower wall of the lamp body 10. In the fourth embodiment, the starter circuit is mounted on a cover 31B attached to a bulb exchange opening 11. A structure of an electromagnetic wave shielding member 50D to be provided in the opening 11 is different from the corresponding one of the first or second embodiment. The remaining construction of the fourth embodiment is substantially the same as of the first and second embodiments. Hence, only those differences of the fourth embodiment will be described.

The cover 31B with the starter circuit is formed with a cylindrical cover body 70 made of aluminum and a starter circuit unit 74 in which a starter circuit is contained in an aluminum case 73. The cover body 70 has an opening at the rear end thereof. A disc-like lid 72 made of aluminum is coupled with the opening of the cover body 70 by a bayonet socket structure. The starter circuit unit 74 is fixed on the side surface of the cover body 70. A cord insertion hole 71 is formed in the side wall of the cover body 70. The cover body 70 includes an extended portion 71a, rectangular in cross section. The portion 71a is located surrounding the cord insertion hole 71.

A power cord 76 is extended from the unit case 73 of the starter circuit unit 74, and passed through the cord insertion hole 71 into the inside of the cover body 70. In the body 70, the power cord 76 is connected to the discharge bulb 14 through the connector 44. A cord insertion hole 77 is formed in the side wall of the unit case 73. A power cord 82, which is extended from a unit case 81 of a ballast circuit unit 80, is connected to a starter circuit in the unit case 73 through the cord insertion hole 77.

The electromagnetic wave shielding member 50D is inserted into the opening of the front part of the cover body 70. Curled elastic pieces 92 are formed on the inner side of a cylindrical member 90 in a state that those pieces are equidistantly spaced in the circumferential direction. The elastic pieces 92 are forward extended to a position where those come in contact with the reflector 17. The rear part of the discharge bulb 14 is surrounded by the electromagnetic wave shielding member 50D. The elastic pieces 92, which are in contact with the reflector 17, are easily elastically deformable in the radial direction. Therefore, the elastic pieces 92 does not interrupt the tilting motion of the reflector unit 16 (reflectors 17 and 18), which is caused by the aiming mechanism 20. Reference numeral 70a represents grooves longitudinally formed in the inner surface of the cover body 70. Numeral 91 is representative of ridges formed on the outer surface of the cylindrical member. 90. The ridges 91 engage with the grooves 70a to lock the electromagnetic wave shielding member 50D.

The electromagnetic wave shielding member 50D is electrically connected to the cover 31B. The conductive unit case 73 is electrically connected to the conductive unit case 81 of the ballast circuit unit 80, through a metal mesh layer of the power cord 82. The unit case 81 is connected to a minus terminal of a battery through the power cord 43. With this connection, earthing of the unit case is secured.

In the embodiment, the electromagnetic wave shielding member 50D and the cover 31B are earthed by the power cords 82 and 43 and the unit case 81 of the ballast circuit unit. In other words, there is no need of using additional cords for earthing the electromagnetic wave shielding member 50D and the cover 31B. This makes it easy to assemble the headlamp.

Figure 11:
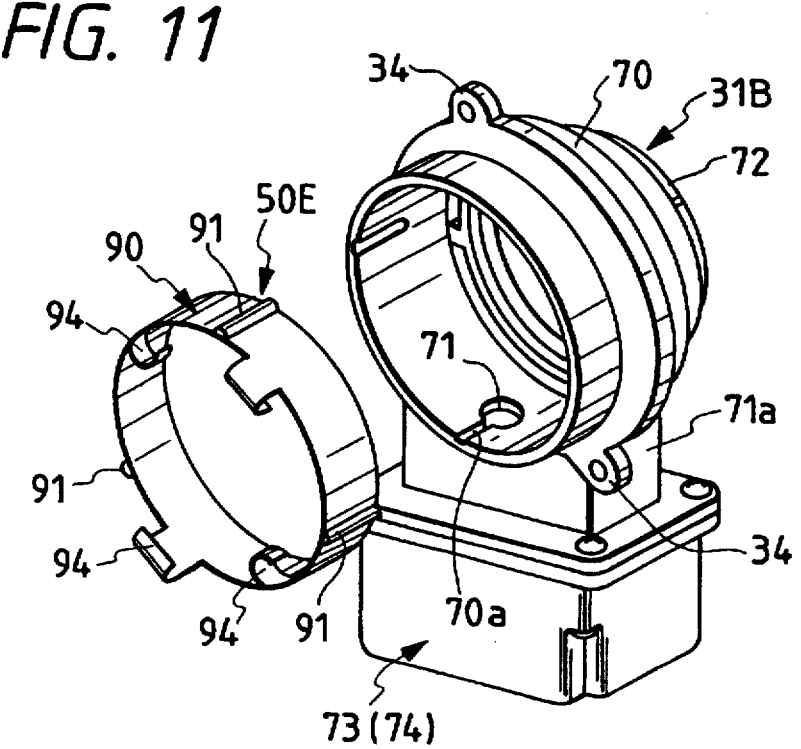
FIG. 11 is a perspective view showing a structure including a conductive cover and an electromagnetic wave shielding member, which constitutes a key portion of a vehicle headlamp according to a fifth embodiment of the present invention.

FIG. 11 is a perspective view showing a structure including a conductive cover and an electromagnetic wave shielding member, which constitutes a key portion of a vehicle headlamp according to a fifth embodiment of the present invention.

An electromagnetic wave shielding member 50E in the present embodiment is different from that of 50D in the fourth embodiment shown in FIGS. 8 through 10 in that elastic pieces 94 shaped like plate springs are protruded forward from the front edge of a cylindrical member 90. Each of the elastic pieces 94 is turned inward and curled.

Figure 12:
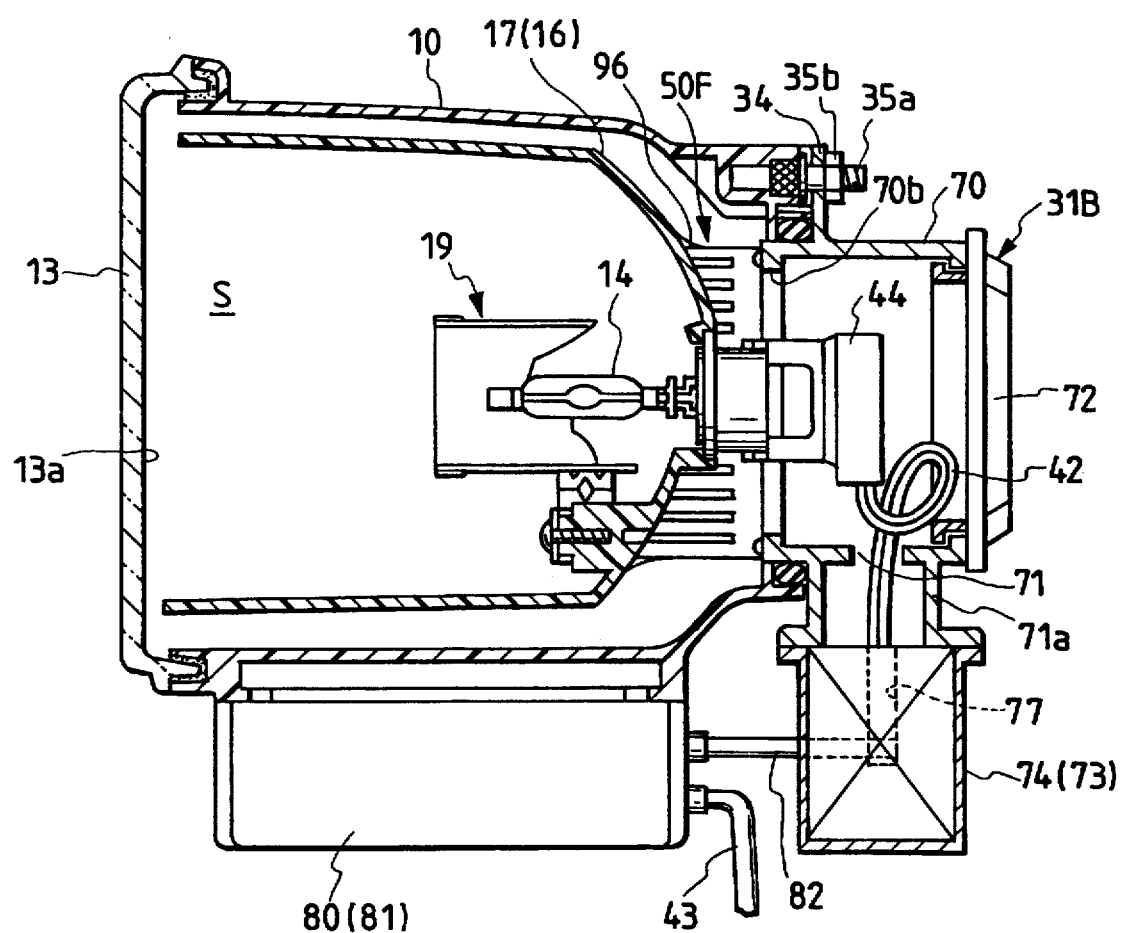
FIG. 12 is a longitudinal sectional view showing a vehicle headlamp according to a sixth embodiment of the present invention.
Figure 13:
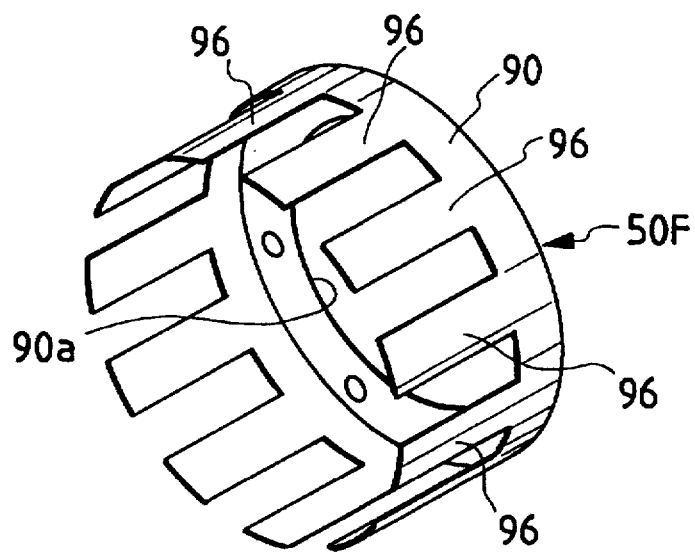
FIG. 13 is a perspective view showing an electromagnetic wave shielding member provided at an opening for bulb exchanging of the lamp body.

FIGS. 12 and 13 show a vehicle headlamp according to a sixth embodiment of the present invention. Specifically, FIG. 12 is a longitudinal sectional view showing the vehicle headlamp of the sixth embodiment, and FIG. 13 is a perspective view showing an electromagnetic wave shielding member as a key portion of the sixth embodiment.

In the present embodiment, an electromagnetic wave shielding member 50F is constructed such that elastic pieces 96 shaped like reeds are extended forward from a cylindrical member 90. A flange part 90a of the electromagnetic wave shielding member 50F is fixed to a flange part 70b of the fore end of the cover body 70 by means of screws.

The remaining construction of the sixth embodiment is substantially the same as of the fourth embodiment, and hence no further description of it will be given.

Figure 14:
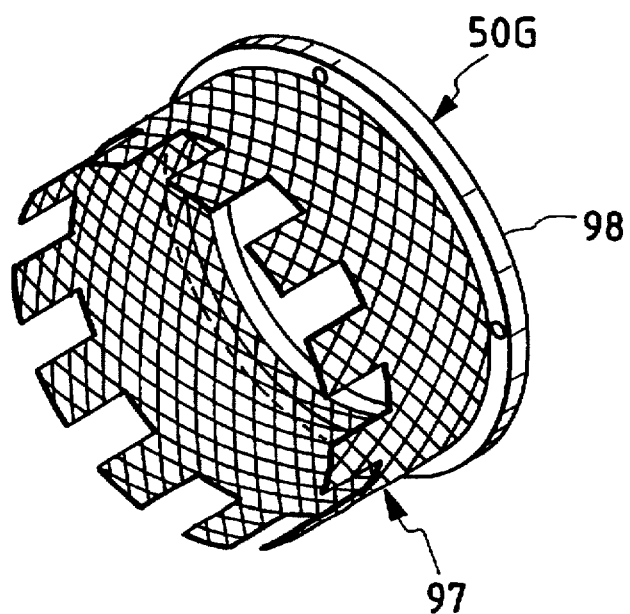
FIG. 14 is a perspective view showing an electromagnetic wave shielding member, which constitutes a key portion of a vehicle headlamp according to a seventh embodiment of the present invention.

The electromagnetic wave shielding member 50F of the sixth embodiment may be modified into an electromagnetic wave shielding member 50G as shown in FIG. 14. The electromagnetic wave shielding member 50G is fixed to the fore end of the cover body 31. The electromagnetic wave shielding member 50G consists of an iron alloy, cylindrical mesh 97 of which the fore end part is cut to form a plural number of reeds, and a doughnut disc 98 to which the base part of the cylindrical mesh 97 is fixed.

Figure 15:
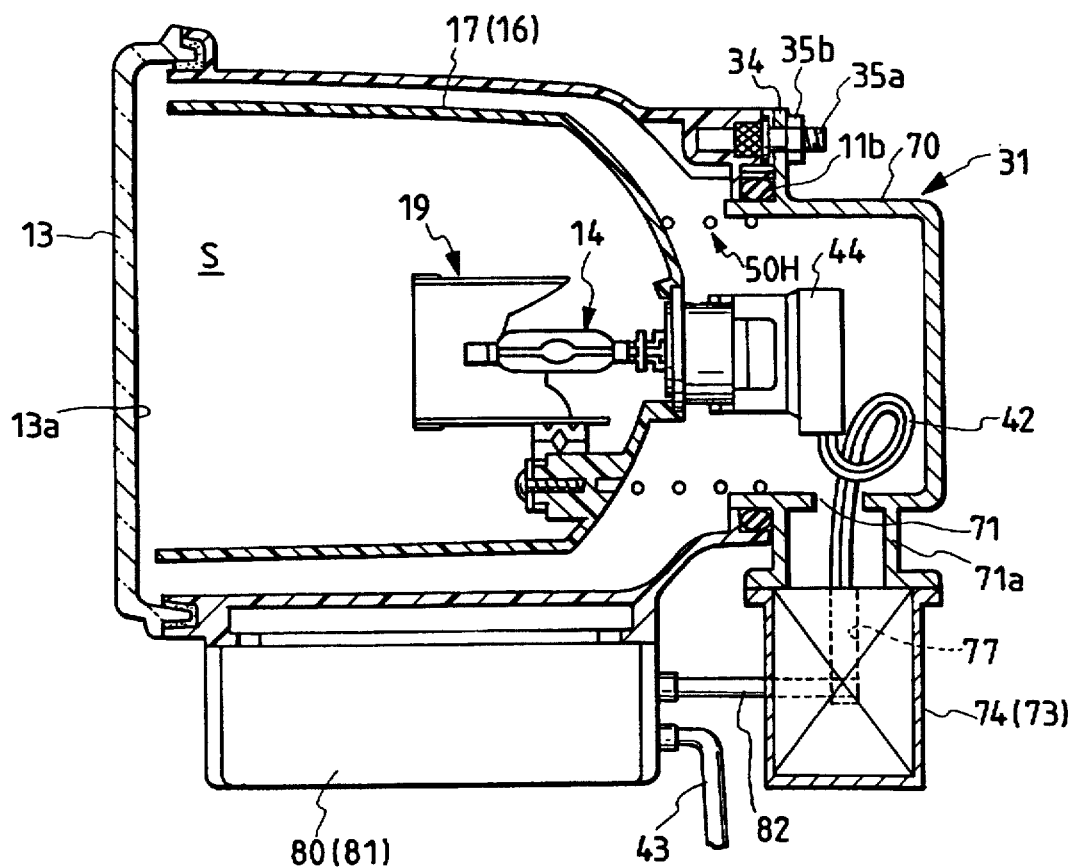
FIG. 15 is a longitudinal sectional view showing a vehicle headlamp according to an eighth embodiment of the present invention.
Figure 16:
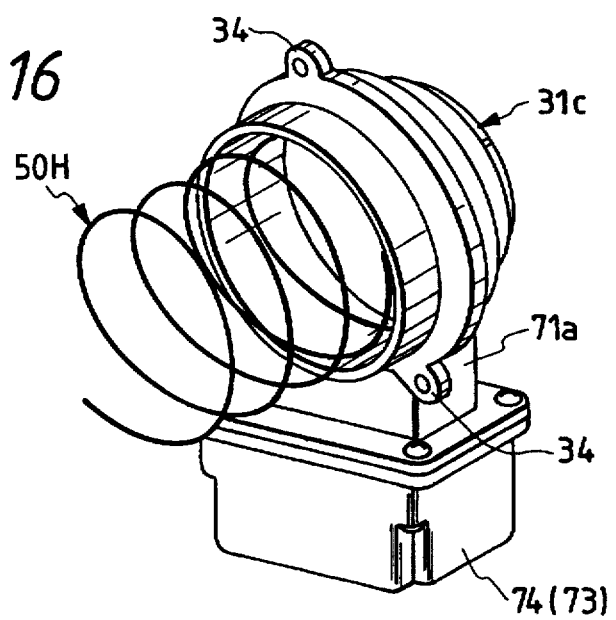
FIG. 16 is a perspective view showing a conductive cover on which an electromagnetic wave shielding member is fixed.

FIGS. 15 and 16 show an eighth embodiment of the present invention. FIG. 15 is a longitudinal sectional view showing a vehicle headlamp of the eighth embodiment, and FIG. 16 is a perspective view showing a conductive cover on which an electromagnetic wave shielding member is fixed.

In the fourth embodiment, the disc-like lid 72 is removably attached to the cover body 70 of the cover 31B with the starter circuit mounted thereon. In a conductive cover 31C in the eighth embodiment, the cover body 70 and the disc-like lid 72 are formed in an integral form. This is a unique feature of the eighth embodiment.

An electromagnetic wave shielding member 50H provided at the front opening of the cover body 70 consists of a compression spring which is disposed in contact with the rear side of the reflector 17.

The remaining construction of the eighth embodiment is substantially the same as of the fourth embodiment, and hence no further description of it will be given.

Figure 17:
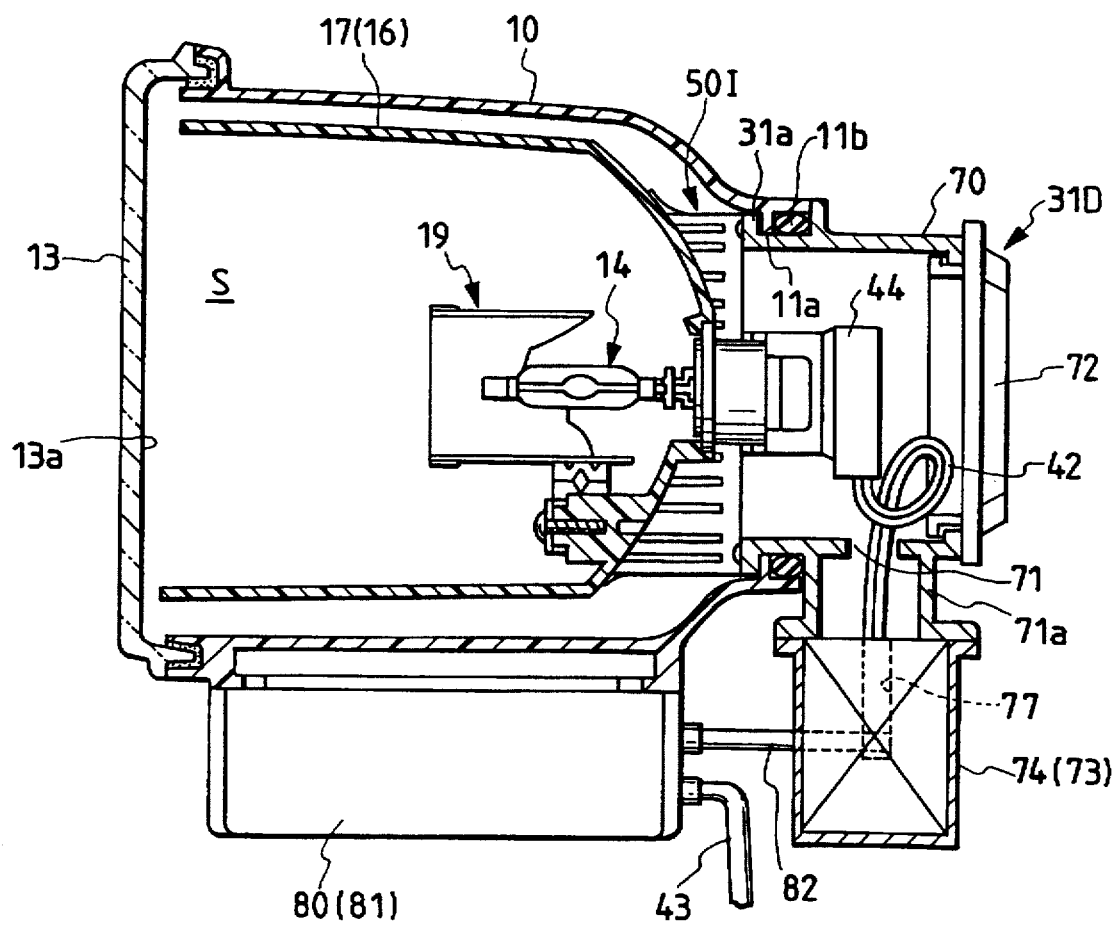
FIG. 17 is a longitudinal sectional view showing a vehicle headlamp according to a ninth embodiment of the present invention.

FIG. 17 is a longitudinal sectional view showing a vehicle headlamp according to a ninth embodiment of the present invention.

In each of the fourth to eighth embodiments, the cylindrical electromagnetic wave shielding member (50D to 50H) is fixed to the cover body (31B, 31C). In the present embodiment, an electromagnetic wave shielding member 50I, which has substantially the same construction as of the electromagnetic wave shielding member 50F in the sixth embodiment, is fixed to the inner side of the opening 11 of the lamp body 10, not the conductive cover 31D.

In the fourth embodiment (FIGS. 12 and 13), the conductive cover 31B is fixed to the opening 11 by the bolt-nut structure. In the present embodiment, the conductive cover 31D is fixed to the opening 11 by a bayonet socket structure.

The remaining construction of the eighth embodiment is substantially the same as of the fourth embodiment, and hence no further description of it will be given.

As seen from the foregoing description, in the vehicle headlamp of the invention, the conductive, electromagnetic wave shielding member that surrounds the rear end of the discharge bulb prevents an electromagnetic wave noise generated from the rear end of the discharge bulb from leaking outside the headlamp. Accordingly, an adverse influence of the electromagnetic wave noise on the electric parts located in the vicinity of the headlamp is considerably lessened.

In the construction of the headlamp according to another aspect of the invention, an electromagnetic wave noise generated from the rear end of the discharge bulb is prevented from leaking outside the headlamp by the cover that is mounted on the bulb exchanging opening of the lamp body and has an electromagnetic wave shielding function, and the conductive, electromagnetic wave shielding member being disposed so as to cover the rear end of the discharge bulb. Accordingly, there is eliminated an adverse influence of the electromagnetic wave noise on the electric parts located in the vicinity of the headlamp.

In the construction of the invention, in the case of the headlamp of the reflector-tiltable type, the electromagnetic wave shielding member does not interrupt the tilting of the reflector, to thereby ensure a smooth aiming adjustment.

In the construction of another aspect of the invention, the electromagnetic wave shielding member that surrounds a power cord connecting the discharge bulb and the starter circuit, and the cover having an electromagnetic wave shielding function prevents an electromagnetic noise generated from the power cord from leaking outside the headlamp. Therefore, the prevention of the electromagnetic wave noise from reaching on the electric parts located in the vicinity of the headlamp is more reliably secured.

A power cord connecting the discharge bulb and the starter circuit or a conductive unit case of a starter circuit unit is used as a part of the earthing wire connecting the electromagnetic wave shielding member or the cover. Accordingly, there is no need of another earthing wire. The result is to simplify the wiring in the lamp and to make the assembling of the lamp easy.

What is claimed is:

1. A vehicle headlamp comprising:

a capsule-like lamp body having a front opening;

a front lens coupled to said front opening of said lamp body;

a lamp chamber defined by said lamp body and said front lens;

a reflector unit disposed in said lamp chamber;

a discharge lamp serving as a light source attached to said reflector unit;

an opening for bulb exchanging formed in a rear wall of said lamp body;

a cover detachably attached to said opening;

a conductive, electromagnetic wave shielding member disposed in said opening, said shielding member surrounding at least a rear part of said discharging bulb; and a power cord connected to said discharge bulb, wherein said electromagnetic wave shielding member is electrically connected to a metal layer formed on said power cord, said electromagnetic wave shielding member being earthed through the metal layer formed on said power cord.

2. The vehicle headlamp according to claim 1, wherein said electromagnetic wave shielding member is made of conductive material, and electrically connected to said cover which is made of conductive material and has an electromagnetic wave shielding function.

3. The vehicle headlamp according to claim 2, wherein said electromagnetic wave shielding member is a cylindrical member constructed such that said cylindrical member surrounds the rear part of said discharge bulb, and the fore end thereof extends forward to come in contact with or in proximity to said reflector.

4. The vehicle headlamp according to claim 3, wherein said electromagnetic wave shielding member is formed with a ring-like member fixed to one of said cover and said lamp body and elastic pieces extending from said ring-like member toward said reflector.

5. The vehicle headlamp according to claim 2, wherein said electromagnetic wave shielding member is a metal plate provided on an inner surface of said lamp body.

6. The vehicle headlamp according to claim 5, wherein a starter/ballast circuit unit containing a starter circuit for applying a high tension to said discharge bulb is fixed to said lamp body, and said power cord for connecting said starter circuit to said discharge bulb and is disposed in a space defined by said electromagnetic wave shielding member and said cover.

7. The vehicle headlamp according to claim 6, wherein said electromagnetic wave shielding member is electrically connected to said cover and said cover is electrically connected to said metal layer formed on said power cord, said electromagnetic wave shielding member and said cover being earthed through the metal layer formed on said power cord.

8. The vehicle headlamp according to claim 6, wherein said electromagnetic wave shielding member is electrically connected to a conductive unit case of said starter/ballast circuit unit, said electromagnetic wave shielding member being earthed through the conductive unit case of said starter/ballast circuit unit.

9. The vehicle headlamp according to claim 2, wherein a starter/ballast circuit unit containing a starter circuit for applying a high tension to said discharge bulb is fixed to said lamp body, and said power cord is for connecting said starter circuit to said discharge bulb and is disposed in a space defined by said electromagnetic wave shielding member and said cover.

10. The vehicle headlamp according to claim 9, wherein said electromagnetic wave shielding member is electrically connected to said power cover and said cover is electrically connected to said metal layer formed on said power cord, said electromagnetic wave shielding member and said cover being earthed through the metal layer formed on said power cord.

11. The vehicle headlamp according to claim 9, wherein said electromagnetic wave shielding member is electrically connected to a conductive unit case of said starter/ballast circuit unit, said electromagnetic wave shielding member being earthed through the conductive unit case of said starter/ballast circuit unit.

12. The vehicle headlamp according to claim 1, wherein said electromagnetic wave shielding member is a cylindrical member constructed such that said cylindrical member surrounds the rear part of said discharge bulb, and the fore end thereof extends forward to come in contact with or in proximity to said reflector.

13. The vehicle headlamp according to claim 12, wherein a starter/ballast circuit unit containing a starter circuit for applying a high tension to said discharge bulb is fixed to said lamp body, and said power cord is for connecting said starter circuit to said discharge bulb and is disposed in a space defined by said electromagnetic wave shielding member and said cover.

14. The vehicle headlamp according to claim 13, wherein said electromagnetic wave shielding member is electrically connected to said cover and said cover is electrically connected to said metal layer formed on said power cord, said electromagnetic wave shielding member and said cover being earthed through the metal layer formed on said power cord.

15. The vehicle headlamp according to claim 13, wherein said electromagnetic wave shielding member is electrically connected to a conductive unit case of said starter/ballast circuit unit, said electromagnetic wave shielding member being earthed through the conductive unit case of said starter/ballast circuit unit.

16. The vehicle headlamp according to claim 1, wherein said electromagnetic wave shielding member is a metal plate provided on an inner surface of said lamp body.

17. The vehicle headlamp according to claim 16, wherein a starter/ballast circuit unit containing a starter circuit for applying a high tension to said discharge bulb is fixed to said lamp body, and said power cord is for connecting said starter circuit to said discharge bulb and is disposed in a space defined by said electromagnetic wave shielding member and said cover.

18. The vehicle headlamp according to claim 17, wherein said electromagnetic wave shielding member is electrically connected to said cover and said cover is electrically connected to said metal layer formed on said power cord, said electromagnetic wave shielding member and said cover being earthed through the metal layer formed on said power cord.

19. The vehicle headlamp according to claim 17, wherein said electromagnetic wave shielding member is electrically connected to a conductive unit case of said starter/ballast circuit unit, said electromagnetic wave shielding member being earthed through the conductive unit case of said starter/ballast circuit unit.

20. The vehicle headlamp according to claim 1, wherein a starter/ballast circuit unit containing a starter circuit for applying a high tension to said discharge bulb is fixed to said lamp body, and said power cord is for connecting said starter circuit to said discharge bulb and is disposed in a space defined by said electromagnetic wave shielding member and said cover.

21. The vehicle headlamp according to claim 1, wherein said electromagnetic wave shielding member comprises a metal conductive film provided on an inner surface of said lamp body.

22. The vehicle headlamp according to claim 1, wherein said electromagnetic wave shielding member is electrically connected to said cover and said cover is electrically connected to said metal layer formed on said power cord, said electromagnetic wave shielding member and said cover being earthed through the metal layer formed on said power cord.

23. A vehicle headlamp comprising:

a capsule-like lamp body having a front opening;

a front lens coupled to said opening of said lamp body;

a lamp chamber defined by said lamp body and said front lens;

a reflector unit disposed in said lamp chamber;

a discharge bulb serving as a light source attached to said reflector unit;

an opening for bulb exchanging formed in a rear wall of said lamp body;

a cover detachably attached to said opening; and a conductive, electromagnetic wave shielding member disposed in said opening, said shielding member surrounding at least a rear part of said discharge bulb, wherein said electromagnetic wave shielding member is a cylindrical member constructed such that said cylindrical member surrounds the rear part of said discharge bulb, and the fore end thereof extends forward to come in contact with or in proximity to said reflector, and further wherein said electromagnetic wave shielding member is formed with a ring-like member fixed to one of said cover and said lamp body and elastic pieces extending from said ring-like member toward said reflector.

* * * * *